United States Patent [19]

Burke, Jr.

[11] 3,967,508

[45] July 6, 1976

[54] LINE PRINTER WITH ESCAPE MECHANISM DRIVING MEANS

[75] Inventor: Edward F. Burke, Jr., Reading, Mass.

[73] Assignee: MFE Corporation, Salem, N.H.

[22] Filed: Apr. 25, 1975

[21] Appl. No.: 571,617

[52] U.S. Cl. .......... 74/128; 74/578

[51] Int. Cl.$^2$ .......... F16H 27/02

[58] Field of Search .......... 74/128, 578

[56] References Cited

UNITED STATES PATENTS

| | | | |
|---|---|---|---|
| 1,657,828 | 1/1928 | Henderson | 74/128 |
| 2,272,929 | 2/1942 | Barth | 74/128 X |
| 2,682,004 | 6/1954 | Schulenburg | 74/128 X |

*Primary Examiner*—Allan D. Herrmann
*Attorney, Agent, or Firm*—Cesari and McKenna

[57] ABSTRACT

An escapement mechanism for driving a shaft about an axis in a line printer each time a solenoid is actuated. An armature in the solenoid moves along a second axis which is normal to the axis of rotation and intersects it. An integrally molded escapement arm is pivotally mounted to the armature and also to a frame for rotation about a third axis which is parallel to the axis of shaft rotation and is spaced from the second axis. A resilient spring on the escapement arm engages a ratchet wheel mounted on a shaft. When the solenoid is actuated, the armature withdraws the escapement arm and the spring. When the solenoid is deenergized, a return spring on the solenoid advances the armature so the drive member engages the ratchet wheel and rotates the shaft. A second ratchet wheel oppositely oriented with respect to the first engages a positioning member on the escapement arm thereby to orient properly the shaft.

9 Claims, 4 Drawing Figures

LINE PRINTER WITH ESCAPE MECHANISM DRIVING MEANS

BACKGROUND OF THE INVENTION

This invention generally relates to a line printer and more specifically to a mechanism for rotating a printing drum shaft or a paper advancement shaft in a line printer.

Various instruments and other data sources produce information for display as alphabetic, alpha-numeric or other characters by output devices, such as line printers. This invention is particularly applicable in a class of line printers comprising a printing drum in the form of a set of type wheels that rotate in unison on a common shaft intermittently between successive positions. A printing hammer is actuated whenever a comparison circuit indicates that a symbol or character on the type wheel then facing the material to be printed corresponds to the character actually to be printed by that wheel.

In prior printers of this type, such as shown in U.S. Pat. No. 3,731,622, assigned to the same assignee as the present invention, solenoid-actuated mechanisms advance the printing drum and a paper advance mechanism. The solenoid armature connects to a link through a pivot and the link rotates about a second pivot displaced from the first pivot. A pawl is also pivotally mounted on a third pivot on the link. A spring biases the pawl against a ratchet wheel. This mechanism tends to be rather bulky and, due to its several pivots, more difficult to manufacture.

Therefore, it is an object of this invention to provide a compact drive mechanism for rotating a shaft to successive discrete positions.

Another object of this invention is to provide a drive mechanism which is more reliable than prior mechanisms.

Still another object of this invention is to provide a drive mechanism which is of small size and relatively inexpensive to manufacture.

SUMMARY

In accordance with this invention, the drive mechanism comprise a solenoid assembly, a single escapement arm and a ratchet assembly for rotating a shaft about an axis of shaft rotation. The solenoid includes an armature which has first and second positions along a second axis which is normal to the axis of rotation and intersects it. The single escapement arm pivots on the solenoid armature and about a third axis which is parallel to the axis of rotation and which is spaced from the second axis. When an armature in the solenoid retracts to a first position, it draws the escapement arm and retracts a drive member along a tooth on a first ratchet wheel. During the armature return stroke, the drive member engages a tooth and rotates the ratchet wheel. A positioning member of the escapement arm engages a tooth surface on another ratchet wheel to properly position the shaft.

This invention is pointed out with particularity in the appended claims. The above and further objects and advantages of this invention may be better understood by referring to the following detailed description taken in conjunction with the accompanying drawings.

DESCRIPTION OF AN ILLUSTRATIVE EMBODIMENT

Figure 1:
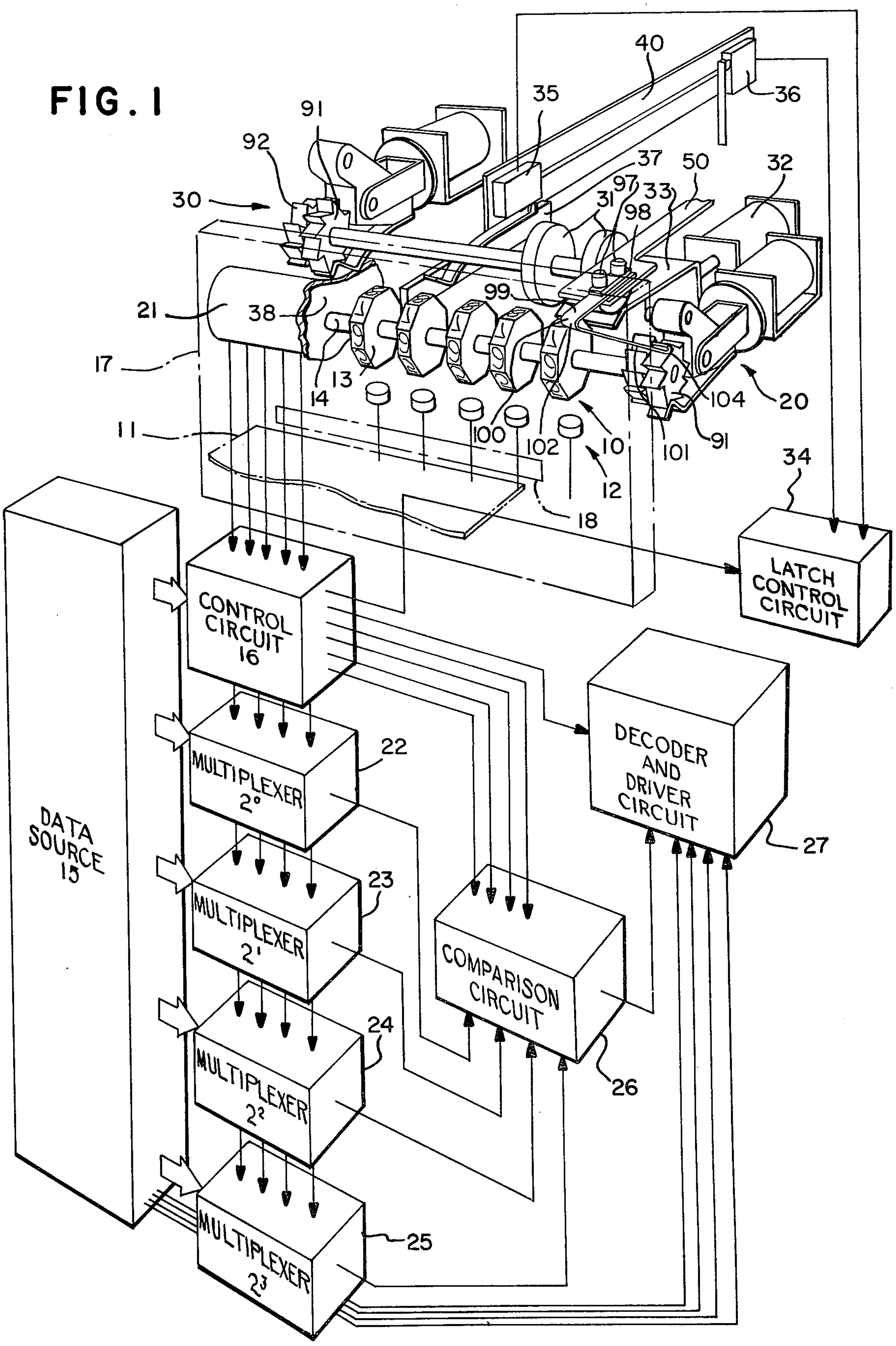
FIG. 1 is a simplified perspective view, in partly schematic form, of a line printer embodying this invention.

Referring now to FIG. 1, a line printer embodying this invention includes a printing drum 10 carrying on its surface type that prints characters on a printable medium, such as a paper ticket 11, in response to the striking action of hammers 12. The drum comprises a set of type wheels 13 mounted on a shaft 14, with the angular position of the wheels being fixed with respect to the shaft by conventional means. The characters to be printed are selected by a data source 15 which provides character selecting signals and other control signals to a control circuit 16. The drum 10, hammers 12 and other parts of the printer generally are mounted in a cabinet which includes a front panel 17 with a slot 18 which serves as an entrance and exit for the ticket 11 or as an exit for paper from a roll.

The drum 10 is rotated in a stepwise fashion by an indexing mechanism constructed in accordance with this invention and generally indicated at 20. A position sensor 21 senses the position of the drum 10 after each stepping operation and transmits a set of signals for each angular position of the drum 10. Each time the indexing mechanism 20 advances the drum to a new position, the position sensor 21 transmits a new set of signals which uniquely identifies the particular angular position. As the type wheels 13 are fixed to the shaft 14, these signals also specify the characters which are then positioned to be printed on the ticket 11 and struck by the hammers 12.

The data source 15 provides a binary-coded-decimal (BCD) or other equivalent signal pattern for each type wheel. Each type wheel prints its characters in a column, so the signals from the data source 15 collectively represent all the characters printed on one line. They are all fed in parallel to multiplexers 22, 23, 24 and 25. Each multiplexer corresponds to a specific bit position and receives a corresponding signal from each BCD pattern transmitted by the data source 15. That is, the multiplexer 22 receives the least significant, or $2^0$, bits for each column while the multiplexer 25 receives the most significant, or $2^3$, bits for each column.

In response to a PRINT command from the data source 15, the control circuit 16 produces, at each position of the printing drum 10, a series of control signals in sequence. A first series of control signals constitute column selection signals which, in sequence, select each type wheel and which select those data signals at the inputs of the multiplexers 22 through 25 which correspond to the designated column. When a comparison circuit 26 receives a pattern of signals for a selected column which is comparable to the pattern of data signals from the position sensor, it enables a printing operation to occur. When all the columns have been designated, the control circuit 16 produces a second series of signals which provide various timing functions during which the drum 10 is advanced to its next position. After the entire sequence of control signals terminates, the control circuit 16 repeats the sequence for the next position of the drum.

When a comparison circuit 26 enables a printing operation, a decoder and drive circuit 27 responds to the control signals to energize one of the hammers 12 which is associated with the identified column to print the character on the ticket 11 or other printable medium. Thus, each line of characters is printed by stepping the drum 10 through all of its positions. At each drum position, all the incoming data signals from the data source 15 are decoded in sequence to determine whether, for that drum position, the character for each column should be printed.

Once all the drum positions have been scanned, the control circuit 16 transmits a paper advance signal. Another indexing mechanism 30 which is contructed in accordance with this invention is substantially identical with the drum advancing indexing mechanism 20. It rotates the drive wheels 31 through a fixed angular step thereby advancing the ticket or other medium to the next position. Then the printer can print the next line.

The line printer shown in FIG. 1 is adapted for receiving and printing tickets. A solenoid 32 controls the position of the plate 33 in response to signals from the latch control circuit 34. The latch control circuit 34 receives signals from a first position sensor 35 and a second position sensor 36 which are disposed adjacent a guide assembly 40. When the solenoid 32 is energized, it retracts the plate 33 to an open position. In this condition, the ticket freely passes between the plate 33 and the drive wheel 31. When the solenoid 32 is not energized, the plate 33 is biased against the drive wheel 31. When the line printer is adapted for printing on paper from a roll inside the line printer, the solenoid 32, plate 33, latch control circuit 34 and sensors 35 and 36 are replaced by a simple mechanical spring mechanism biased against the drive wheels. In either case, rotation of the drive wheels 31 by the mechanism 30 indexes the paper to successive positions in the printer.

In accordance with this invention, both the indexing mechanisms 20 and 30 have the same structure. The following description is directed to the indexing mechanism 30 which is shown in an exploded view in FIG. 2. The indexing mechanism 30 is affixed to a frame 50 such that an armature 51 moves along a longitudinal axis which is normal to the axis of rotation 14A of the shaft 14 and which intersects it. A clevis yoke 52 has a base portion 53 affixed to one end of the armature 51 and bifurcated arms 54 which provide spaced pivot supports 55.

An escapement arm 56 mounts on a pivot shaft 57 which the pivot supports 55 carry. The pivot shaft passes through a hole 60 in the escapement arm so the escapement arm 56 is mounted for rotation about the pivot shaft axis which is parallel to the axis 14A. As shown more clearly in FIG. 3A, the escapement arm has a first base portion 61 which includes a pair of apertures for receiving mounting screws 63. The mounting screws 63 locate and support a spring 64 by means of a spring clamp plate 65. Another base portion 66 is contiguous the base portion 61 and coextensive with the spring 64. It is beveled with respect to the base portion 61 so the spring 64 can flex. Both base portions 61 and 66 are disposed below the axis of the pivot shaft 57.

Figure 2:
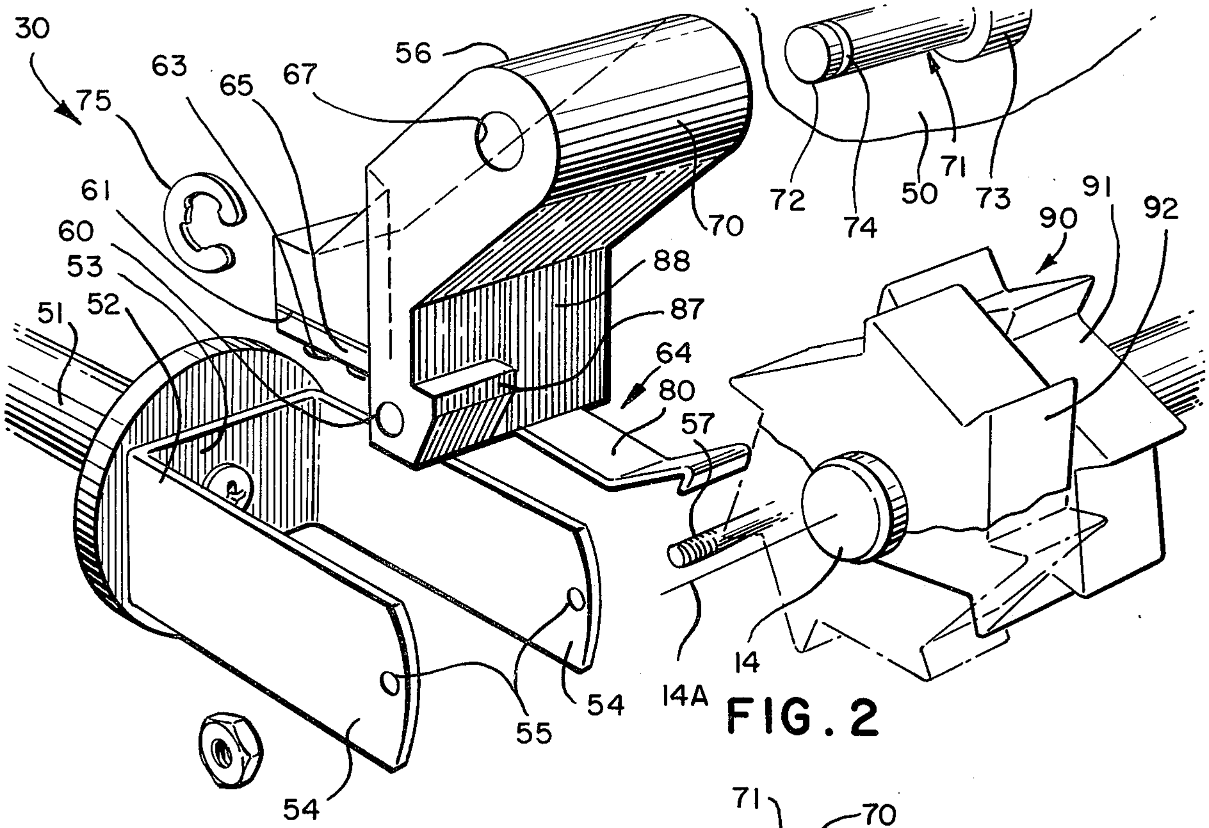
FIG. 2 is an exploded view of a drive mechanism as shown in FIG. 1.

Another hole 67, shown in FIG. 2 above and to the left of the pivot shaft 57 and through an extension 70, carries an escapement arm shaft 71. The escapement arm shaft 71 has a shaft portion 72 which is located within the hole 67 and a shoulder portion 73. An angular groove 74 receives a C-ring 75 thereby to lock the escapement arm shaft 71 in the escapement arm 56. The other end surface of the shoulder 73 abuts the frame 50, so the shaft 71 provides a second pivot for the escapement arm 56. It is attached rigidly to the frame 50.

Figure 3B:
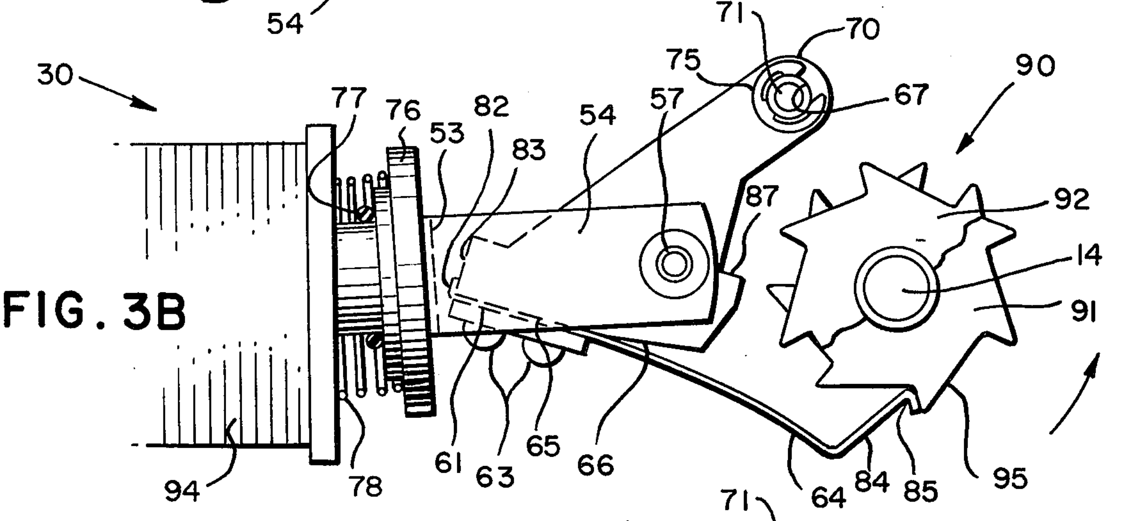
FIGS. 3A and 3B are side elevations of the drum indexing mechanism shown in FIG. 2 illustrating the mechanism in its at rest and cocked positions, respectively.
Figure 3A:
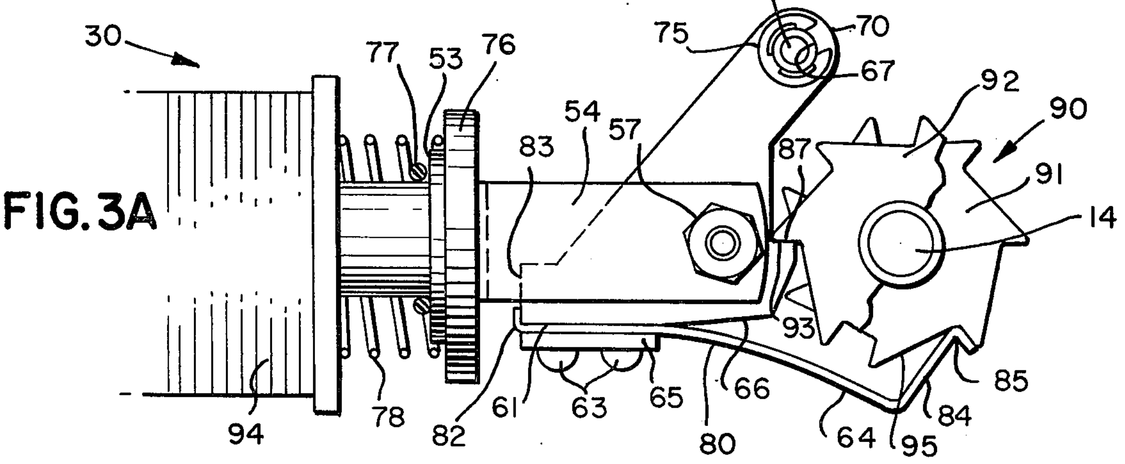

As also shown in FIG. 3A, an annular spacer 76 is located on the armature 51 and held generally against the base portion 53 of the clevis yoke 52 by an O-ring 77. The O-ring 77 retains this annular spacer 76 in position during assembly. Additionally, the O-ring 77 damps vibrations otherwise caused when the spacer 76 strikes the solenoid when the solenoid is energized. The annular spacer 76 also is a base for a conical spring 78 which biases the armature 51 to the right.

Referring to FIGS. 2 and 3A, the escapement drive spring 64 has an elongated main body portion 80, apertures for the screws 63, a tail portion 82 for engaging a back surface 83 of the escapement arm 56, an offsetting portion 84 and an offset hook portion 85. The outer surface of the hook portion 85 constitutes a driving surface.

A planar protuberance 87 also is formed on a surface 88 of the escapement arm 56 adjacent base portion 66. This protuberance is spaced from the drive spring 64.

Referring to FIGS. 3A and 3B, the escapement arm shaft 71 is mounted to the frame 15 so that the shoulder portion 73 properly orients the drive spring member 64 and the protuberance 87 with a ratchet assembly 90 mounted on and affixed to the shaft 14. The ratchet assembly 90 has one wheel 91 with teeth oriented for being driven in a counter-clockwise direction, and the wheel 91 is aligned with the driving spring member 64. Another wheel 92 has its teeth oriented for being driven in a clockwise direction, is angularly offset from the wheel 91 and is aligned with the protuberance 87. In FIGS. 1 and 3A, the drive mechanism is shown in an "at rest" position. The spring 78 has driven the armature 51 to the right and the spring 64 engages one tooth on the ratchet wheel 90. Motion is stopped, however, because the protuberance 87 abuts a tooth surface 93 on the ratchet wheel 91. In this position, protuberance 87 positively positions the shaft 14 and serves, therefore, as a positioning member.

When the drive mechanism 30 is actuated, the magnetic field induced in a solenoid coil 94 causes the armature 50 to retract and compress the spring 78. As the drive spring member 64 retracts, it slides over a tooth surface 95. Simultaneously the protuberance 87 also is withdrawn so the ratchet assembly can subsequently be rotated to a new position. In any particular mechanism, an anti-rotation assembly keeps the wheel from turning in a reverse direction. The friction provided by the plate 33 in FIG. 1 or the alternate spring plate, inhibits reverse motion and acts as an anti-rotation assembly in this mechanism.

When the armature 51 is fully retracted, the drive spring member 64 slips off the tooth surface 95 and drops against the surface of an adjacent tooth as shown in FIG. 3B. When the solenoid coil 94 is then de-energized, the spring 78 drives the assembly forward thereby rotating the ratchet assembly 90 and the shaft 14 until the protuberance 87 abuts a tooth on the wheel 92 thereby to properly position the shaft 14.

As previously indicated, the drive mechanism 20 uses the same basic assembly. It is merely necessary to reverse the escapement arm shaft 71 so the shoulder portion 73 is adjacent the side of the escapement arm 56 on which the protuberance 87 is formed. The use of identical assemblies in this manner reduces the overall costs of the line printer. A positive anti-rotation assembly is necessary in this arrangement of the indexing mechanism 20. This anti-rotation assembly, shown in detail in FIG. 1, comprises screws 97 and a plate 98 for mounting a spring 99 to the frame 50. The spring 99 has a base portion 100 which is clamped to the frame 50 by the plate 98 and screws 97. An offsetting return portion 101 produced by a reverse bend 102 is made so that the portion 101 and another bend 104 provide a bearing surface which engages the drive wheel 91 to prevent counter-clockwise rotation.

Thus, in accordance with this invention, the armature 51 in FIG. 2 reciprocates on an axis which is normal to the axis of shaft rotation and which intersects it. This arrangement eliminates one link which existed in the prior line printer described earlier. Although the pivot shaft 57 moves along a circle centered on the escapement arm shaft 71, the escapement arm 56 and armature 51 are oriented so that the armature 51 lies substantially along a tangent of that circle. As a result, the pivot shaft 57 only undergoes a minimal vertical displacement. The tolerances between the armature 51 and the solenoid 93 absorb this motion. It will also be apparent that this mechanism is a very compact structure and, in accordance with another object of this invention, a very reliable structure.

Thus, the disclosed unit provides the desired and simple design. The advancing mechanism is less expensive because it requires fewer elements and is easier to produce. Although this invention has been described with respect to a specific embodiment, it will be apparent that different variations and modifications can be made to the specifically disclosed structure, such as changes to the details of various elements and fastening members. Therefore, it is the object of the appended claims to cover all such variations and modifications as come within the true spirit and scope of this invention.

What is claimed as new and desired to be secured by Letters Patent of the United States is:

1. A drive mechanism for rotating a shaft mounted on a frame about an axis of rotation in a first direction, said mechanism comprising:

A. a solenoid assembly mounted to the frame and including an armature which has first and second positions along a second axis which is normal to the axis of rotation and which intersects it, B. a single escapement arm mounted to said solenoid armature and pivoted in the frame for rotation on a third axis parallel to the axis of rotation and spaced from the second axis, said arm including a drive member and a positioning member, and C. a ratchet assembly with first and second angularly opposed ratchet wheels, said ratchet assembly being affixed to the shaft and positioned so said drive member coacts with said first ratchet wheel to rotate the shaft through a substantially fixed angle in a first direction when said armature moves from the second to the first position, said positioning member, in the first position of said armature, coacting with said second ratchet wheel to accurately position the shaft.

2. A drive mechanism as recited in claim 1 wherein said solenoid assembly additionally comprises a clevis yoke with a base portion attached to and overlying the end of said armature and bifurcated arms extending from said base portion for pivotal connection to said escapement arm.

3. A drive mechanism as claimed in claim 2 additionally comprising spacer means mounted on said armature for positioning said armature in said solenoid.

4. A drive mechanism as recited in claim 3 wherein said spacer means includes an annular spacer juxtaposed to and abutting said base portion and an O-ring for retaining said annular spacer in position.

5. A drive mechanism as recited in claim 2 additionally comprising a second pivot for mounting said escapement arm to said clevis yoke.

6. A drive mechanism as recited in claim 5 wherein said escapement arm is formed with first and second angularly displaced planar surfaces, said first planar surface being substantially parallel to the armature axis and wherein said drive member comprises a spring member connected to said first surface and overlying said second surface, said spring member having an offset drive surface for engaging said first ratchet wheel.

7. A drive mechanism as recited in claim 1 additionally comprising means mounted to said frame for inhibiting rotation of the shaft in a second direction.

8. A drive mechanism as recited in claim 7 wherein said inhibiting means comprises a spring member affixed to the frame and contacting said second ratchet wheel.

9. A drive mechanism as recited in claim 7 wherein the shaft has wheel means mounted thereto for rotation in one direction and said inhibiting means comprises a plate member biased against said wheel means.

* * * * *